United States Patent [19]

Busby

[11] Patent Number: 6,079,726
[45] Date of Patent: Jun. 27, 2000

[54] DIRECT DRIVE BICYCLE

[75] Inventor: James S. Busby, Costa Mesa, Calif.

[73] Assignee: GT Bicycles, Inc., Santa Ana, Calif.

[21] Appl. No.: 08/856,469

[22] Filed: May 13, 1997

[51] Int. Cl.$^7$ ........................................................ B62M 1/02
[52] U.S. Cl. .............................................................. 280/261
[58] Field of Search ................................. 280/259–261, 280/236, 238; 74/68, 63, 594.1, 594.2

[56] References Cited

U.S. PATENT DOCUMENTS

| | | |
|---|---|---|
| D. 372,002 | 7/1996 | Busby et al. . |
| 439,095 | 10/1890 | Becker . |
| 578,615 | 3/1897 | Travis . |
| 606,323 | 6/1898 | Wronski . |
| 657,667 | 9/1900 | Mills . |
| 944,795 | 12/1909 | Leet et al. . |
| 1,047,430 | 12/1912 | Michaelson . |
| 1,130,828 | 3/1915 | Kuehn . |
| 1,257,761 | 2/1918 | Strand . |
| 1,298,958 | 4/1919 | Johnston . |
| 1,412,012 | 4/1922 | Bruno . |
| 1,594,079 | 1/1926 | Tanner . |
| 2,132,317 | 10/1938 | Pease ........................................ 280/284 |
| 2,283,671 | 5/1942 | Finlay et al. ............................. 280/284 |
| 2,446,731 | 8/1948 | Wheeler ................................... 280/284 |
| 3,522,957 | 8/1970 | Topor ....................................... 280/283 |
| 3,834,721 | 9/1974 | Gobby ...................................... 280/236 |
| 3,917,313 | 11/1975 | Smith et al. ............................. 280/284 |
| 3,942,821 | 3/1976 | Bock ........................................ 280/277 |
| 3,948,543 | 4/1976 | MacDonald et al. .................... 280/284 |
| 4,039,200 | 8/1977 | McGonegle ............................. 280/284 |
| 4,046,396 | 9/1977 | Taylor et al. ............................ 280/281 |
| 4,058,181 | 11/1977 | Buell ........................................ 180/32 |
| 4,186,936 | 2/1980 | Offenstadt et al. ...................... 280/277 |
| 4,322,088 | 3/1982 | Miyakoshi et al. ..................... 280/284 |
| 4,421,337 | 12/1983 | Pratt ........................................ 280/277 |
| 4,433,850 | 2/1984 | Miyakoshi et al. ..................... 280/277 |
| 4,506,755 | 3/1985 | Tsuchida et al. ........................ 180/227 |
| 4,529,056 | 7/1985 | Kreuz ....................................... 180/227 |
| 4,568,101 | 2/1986 | Bleustein et al. ....................... 208/707 |
| 4,673,053 | 6/1987 | Tanaka et al. ........................... 180/227 |
| 4,679,811 | 7/1987 | Shuler ...................................... 280/284 |
| 4,732,404 | 3/1988 | Coetzee ................................... 280/283 |
| 4,789,174 | 12/1988 | Lawwill ................................... 280/284 |

(List continued on next page.)

FOREIGN PATENT DOCUMENTS

| | | |
|---|---|---|
| 155582 | 3/1954 | Australia . |
| 923235 | of 1947 | France . |
| 2395879 | 3/1979 | France . |
| 3033294 | 4/1981 | Germany ............................. 280/285 |
| 421518 | of 1947 | Italy . |
| 423515 | of 1947 | Italy . |
| 428442 | 12/1947 | Italy ..................................... 280/285 |
| 540821 | 3/1956 | Italy ..................................... 280/284 |
| 5105168 | 4/1995 | Japan . |
| 24918 | of 0000 | United Kingdom ................. 280/284 |
| 17336 | of 1913 | United Kingdom ................. 208/44 |
| 15332 | of 1915 | United Kingdom ................. 208/93 |
| 220760 | 8/1924 | United Kingdom . |
| PCTGB9200397 | 9/1992 | WIPO . |
| PCTUS9300502 | 7/1993 | WIPO . |

OTHER PUBLICATIONS

1992 Cannondale Spec—Suspension Mountain Biccyles–Article–10 pgs.

Guide To Suspension & High Performance; (Get With It) "Suspension Speak"; vol. 3, 1992; pp. 9, 13, 14, 30, 31, 36–45, 47, 53, 60, 69–, 85, 86, –92, 96, 98, 100, 108–112, 117 & 119.

"Schwinn Buell", Guide To Suspension, vol. 3, 1992, 4 pages.

(List continued on next page.)

*Primary Examiner*—Christopher P. Schwartz
*Assistant Examiner*—C. T. Bartz
*Attorney, Agent, or Firm*—Stetina Brunda Garred & Brucker

[57] ABSTRACT

A direct drive bicycle comprising a bicycle frame having a housing attached thereto. Rotatably mounted within the housing is a variable rate transmission unit having rotatable input and output shafts. Rotatably connected to the housing is a chain wheel. The chain wheel is mechanically coupled to the input shaft of the transmission unit in a manner wherein the rotation of the chain wheel facilitates the rotation of the input shaft.

13 Claims, 2 Drawing Sheets

U.S. PATENT DOCUMENTS

| | | | |
|---|---|---|---|
| 4,792,150 | 12/1988 | Groendal et al. | 280/275 |
| 4,815,763 | 3/1989 | Hartmann | 280/276 |
| 4,951,791 | 8/1990 | Creixell | 180/219 |
| 4,997,197 | 3/1991 | Shultz | 280/275 |
| 5,000,470 | 3/1991 | Kamler et al. | 280/275 |
| 5,014,808 | 5/1991 | Savard et al. | 180/219 |
| 5,080,384 | 1/1992 | Groendal et al. | 280/275 |
| 5,098,114 | 3/1992 | Jones | 280/284 |
| 5,102,155 | 4/1992 | Chou | 280/261 |
| 5,121,937 | 6/1992 | Lawwill | 280/284 |
| 5,205,572 | 4/1993 | Buell et al. | 280/284 |
| 5,226,674 | 7/1993 | Buell et al. | 280/284 |
| 5,240,269 | 8/1993 | Kerr | 280/285 |
| 5,244,224 | 9/1993 | Busby | 280/284 |
| 5,259,637 | 11/1993 | Busby | 280/284 |
| 5,269,552 | 12/1993 | Yelverton | 280/283 |
| 5,284,354 | 2/1994 | McWethy | 280/284 |
| 5,295,702 | 3/1994 | Buell | 280/284 |
| 5,306,036 | 4/1994 | Busby | 280/284 |
| 5,332,246 | 7/1994 | Buell | 280/284 |
| 5,335,929 | 8/1994 | Takagaki et al. | 280/283 |
| 5,354,085 | 10/1994 | Gally | 280/284 |
| 5,370,411 | 12/1994 | Takamiya et al. | 280/284 |
| 5,409,249 | 4/1995 | Busby | 280/284 |
| 5,441,292 | 8/1995 | Busby | 280/284 |
| 5,553,881 | 9/1996 | Klassen et al. | 280/284 |
| 5,577,749 | 11/1998 | Ross | 280/261 |

OTHER PUBLICATIONS

Suspension Mania Strikes Cycling—Mountain Bike Action/Feb. '92, 3 Pgs.

Boulder Intrepid Al—2 pgs.—Mountain Bike Action/Mar. '92.

Fischer RS–1—Article–4 pgs.—Mountain Bike Action/Mar. '92.

"Litespeed Suspension", Mountain Bike Action—May '92, 1 page.

Schwinn S.A.S.S.—7 pgs.—Mountain Bike Action—May '1992.

Bicycling, May, 1992, pp. 26, 27, 58, 63, 64, and 105.

Welcome to the Next Generation . . . —9 pgs.—Mountain Bike Action—June '92.

Team Shockblok—6 pgs.—Mountain Bike Action—Jul. '92.

Beating Around the Bush; Mountain Bike Action—Oct. 1992—21 pgs.

Mountain Biking, Nov. 1992, vol., 6, No. 11—22 pages.

Mountain Bike Action, Dec. 1992—14 pages.

Mountain Bike Action, "San Andreas Report Card—Peccadillos, Peculiarities & Traits", Dec. 1992, pp. 80–81.

Mountain Bike Action, "AMP Mongoose", Jul. 1992, pp. 5 pgs.

Mountain Bike Action, "Buyer's Guide", May 1993, pp. 108 & 110.

Mountain Biking; "Pass Press 93"; Jan. 1993; vol. 7; No. 1; 10 pgs.

Mountain Biking, "Yeti–Lawwill DH: The Bike That Mert Built". vol. 10, No. 9, Sep. 1996, pp. 64–70.

Mountain Bike, "Yeti Downhill Bike", Sep. 1996, vol. 12, No. 8. pp. 71–75.

Mountain & City Biking, "Slingshot", 6 pgs.

Offroad Pro–Flex 550—3 pgs.—OFFROAD.

TREK 9000 Series Spec="This Beauty Is A Beast"—Article—8 pages.

"Speed Zone", Mountain Bike, Oct. 1997, p. 32.

"GT Gearbox", Mountain Bike, Dec. 1997, p. 80.

Photo, "Alex Morgan" "BCD".

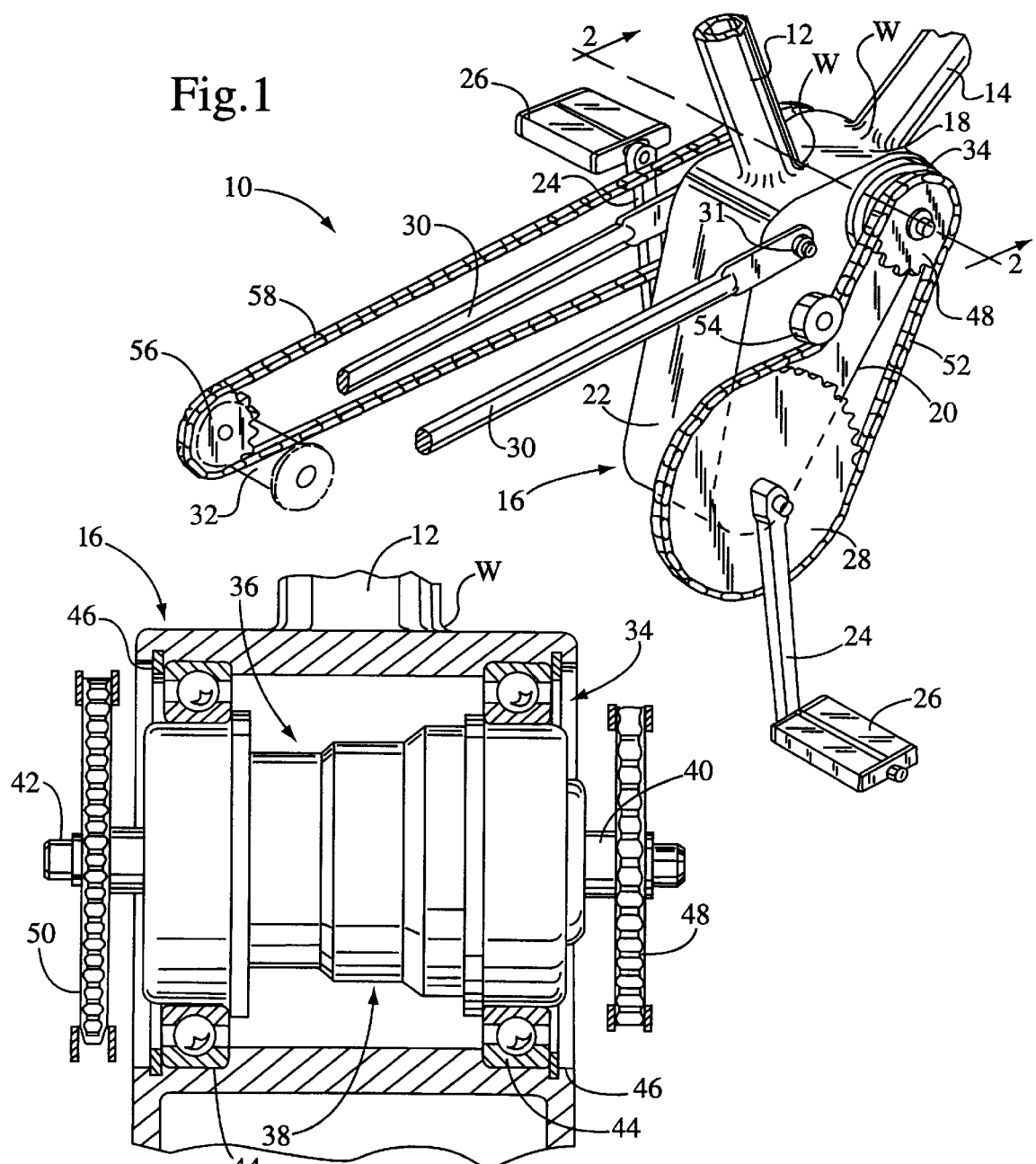

DIRECT DRIVE BICYCLE

FIELD OF THE INVENTION

The present invention relates generally to bicycles, and more particularly to a direct drive bicycle including a variable rate transmission which eliminates the need to include multiple chain wheels, a rear wheel sprocket cluster, and front and rear derailleurs to achieve multiple speed capability.

BACKGROUND OF THE INVENTION

Well known in the prior art are multiple speed bicycles (e.g., a "ten-speed") which generally comprise a bicycle frame consisting of a top tube, down tube, seat tube, a pair of seat stays, and a pair of chain stays. The top, down and seat tubes generally define a front triangle of the bicycle frame, with the seat tube, seat stays and chain stays collectively defining a rear triangle of the bicycle frame. The back ends of corresponding pairs of the seat and chain stays are attached to respective ones of an opposed pair of drop-outs adapted to accommodate the rear wheel axle of the rear wheel. In prior art multiple speed bicycles, the bottom ends of the down and seat tubes and the front ends of the chain stays are typically attached to a sleeve which rotatably accommodates a bottom bracket axle. Attached to the bottom bracket axle is a pair of pedal cranks, each of which includes a pedal roatatably connected thereto.

In addition to the pedal cranks, attached to the bottom bracket axle are multiple chain wheels of differing diameters. Similarly, attached to the rear wheel axle is a sprocket cluster consisting of multiple sprockets of differing diameters. One of the chain wheels is mechanically coupled to one of the sprockets of the sprocket cluster via a drive chain. In the prior art multiple speed bicycles, the drive chain may be selectively shifted onto any one of the chain wheels via a front derailleur which is typically attached to the seat tube. Additionally, the drive chain may be selectively shifted to any one of the sprockets of the sprocket cluster via a rear derailleur which is typically attached to one of the drop-outs.

Though prior art multiple speed bicycles have been in existence for many years, they posses certain deficiencies which detract from their overall utility. More particularly, the front and rear derailleurs of the bicycle are of complex construction and typically include multiple parts or components. As such, the derailleurs are extremely susceptible to mechanical failure or breakage, particularly when the bicycle is used in off-road conditions as generally occurs with multiple speed mountain bikes. Additionally, because of their relatively complex construction, the front and rear derailleurs are also susceptible to being displaced from their normal orientations and falling out of proper adjustment when exposed to debris such as dirt or rocks, or when subjected to a sudden impact force as typically occurs when the rider falls. Any such displacement of the front or rear derailleurs usually causes the drive chain to be completely disengaged from the chain wheels or the sprockets of the sprocket cluster when shifting between the chain wheels or the sprockets is attempted by the rider. The re-adjustment of the front and rear derailleurs or the repair thereof in the event of breakage is usually both expensive and time consuming. Additionally, because of the relatively large number of sprockets typically included in the sprocket cluster on the rear wheel axle, the rear wheel cannot be provided with a wide "stance", which would assist in the handling of the bicycle.

The present invention addresses the deficiencies of prior art multiple speed bicycles by providing a direct drive bicycle which includes a variable rate transmission unit. The inclusion of the transmission unit within the bicycle of the present invention provides multiple speed capability, while eliminating the multiple chain wheels, sprocket cluster, and front and rear derailleurs of conventional multiple speed bicycles. In this respect, the direct drive bicycle of the present invention includes only a single chain wheel and a single sprocket attached to the rear wheel thereof. The transmission unit is itself mounted within a housing which protects the same from exposure to and thus potential damage from debris such as dirt and rocks, and further shields and protects the transmission unit in the event the rider falls.

SUMMARY OF THE INVENTION

In accordance with the present invention there is provided a direct drive bicycle comprising a bicycle frame which generally includes an elongate seat tube, an elongate down tube, and a pair of elongate chain stays. Attached to the bicycle frame of the direct drive bicycle is a gear box cartridge or housing. More particularly, the cartridge or housing is attached to the bottom ends of the seat and down tubes, with the front ends of the chain stays being pivotally connected to the housing. In addition to the housing, also attached to the bicycle frame is a rear wheel, the axle of which is rotatably connected to a pair of drop-outs attached to the back ends of respective ones of the chain stays.

Rotatably mounted within the housing is a variable rate transmission unit having rotatable input and output shafts extending therefrom. In the preferred embodiment, the transmission unit is rotatably mounted within the housing via a spaced pair of bearing members. Attached to the input shaft of the transmission unit is an input sprocket, while attached to the output shaft of the transmission unit is an output sprocket. The front ends of the chain stays are pivotally connected to the housing at a pivot point which is disposed adjacent the transmission unit rotatably mounted within the housing.

Rotatably connected to the housing is a chain wheel which is mechanically coupled to the input shaft via an input chain which extends between the chain wheel and the input sprocket. More particularly, the chain wheel is attached to a crank axle which is rotatably connected to the housing. Also attached to the crank axle is a pair of pedal cranks, each of which includes a pedal rotatably connected thereto. Due to the extension of the input chain between the chain wheel and the input sprocket, the rotation of the chain wheel facilitates the rotation of the input shaft. Also rotatably connected to the housing is an idler pulley which is cooperatively engaged to the input chain for maintaining a desired level of tension thereon.

In addition to the input chain, the direct drive bicycle of the present invention includes an output chain which extends between the output sprocket and a rear wheel sprocket attached to the rear wheel, and more particularly the axle thereof. The output chain mechanically couples the output shaft to the rear wheel in a manner wherein the rotation of the output shaft facilitates the rotation of the rear wheel.

BRIEF DESCRIPTION OF THE DRAWINGS

These, as well as other features of the present invention, will become more apparent upon reference to the drawings wherein:

FIG. 1 is a partial perspective view of the drive assembly of the direct drive bicycle constructed in accordance with the present invention;

FIG. 2 is a cross-sectional view taken along line 2—2 of FIG. 1; and

DETAILED DESCRIPTION OF THE PREFERRED EMBODIMENT

Figure 3:
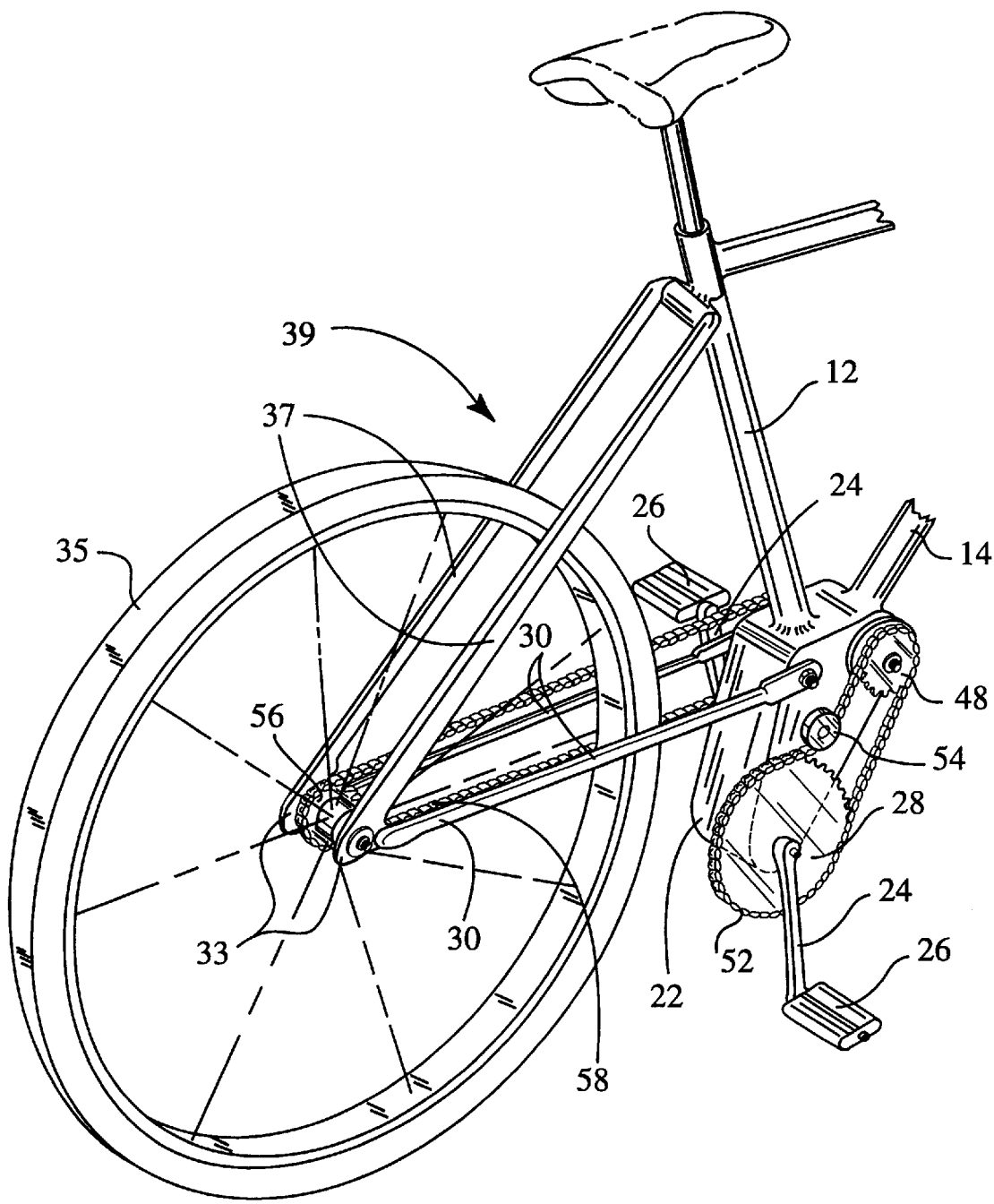
FIG. 3 is a side-elevational view of the rear assembly of the present direct drive bicycle.

Referring now to the drawings wherein the showings are for purposes of illustrating a preferred embodiment of the present invention only, and not for purposes of limiting the same, FIG. 1 perspectively illustrates the drive assembly 10 of a direct drive bicycle constructed in accordance with the present invention. The direct drive bicycle comprises a bicycle frame which includes a front triangle having an elongate top tube, an elongate seat tube 12, and an elongate down tube 14. The front end of the top tube and the top end of the down tube 14 are typically attached to a head tube which accommodates the stem of the handle bars. Telescopically received into the top end of the seat tube 12 is a seat post having a saddle or seat attached to the top end thereof.

Referring now to FIGS. 1 and 2, attached to the front triangle of the bicycle frame, and more particularly to the bottom ends of the seat and down tubes 12, 14, is a gear box cartridge or housing 16. As shown in FIG. 1, the cartridge or housing 16 is rigidly attached to the bottom ends of the seat and down tubes 12, 14 via welds W, though alternative attachment methods such as bolting or bonding may also be employed in the direct drive bicycle of the present invention. The cartridge or housing 16 has a generally three-sided configuration, and defines a top surface 18, an inwardly sloping front surface 20, and an outwardly sloping back surface 22. The top, front and back surfaces 18, 20, 22 are separated by respective ones of three rounded corner regions. The bottom end of the seat tube 12 is attached to the top surface 18, with the bottom end of the down tube 14 being attached to the corner region defined between the top and front surfaces 18, 20.

Extending laterally through the housing 16 is close proximity to the corner region defined between the front and back surfaces 20, 22 is a crank axle bore which is sized and configured to rotatably accommodate a crank axle. Attached to respective ones of the opposed ends of the crank axle is a pair of elongate pedal cranks 24, each of which includes a pedal 26 rotatably connected to the distal end thereof. Attached to the crank axle between the housing 16 and one of the pedal cranks 24 is a chain wheel 28. As will be recognized, the rotation of the crank axle via the pedals cranks 24 and pedals 26 facilitates the concurrent rotation of the chain wheel 28 attached to the crank axle.

In addition to the crank axle bore, disposed within and extending laterally through the housing 16 in close proximity to the corner region defined between the top and back surfaces 18, 22 is a swing arm pivot bore. In this respect, in addition to the front triangle, the bicycle frame of the direct drive bicycle of the present invention includes a pair of elongate chain stays 30, the front ends of which are pivotally connected to the housing 16 via the extension of a fastener such as a pivot pin 31 through the swing arm pivot bore within the housing 16. The back ends of the chain stays 30 each include a drop-out attached thereto, with the opposed drop-outs 33 being adapted to rotatably accommodate the axle 32 of the rear wheel 35 of the direct drive bicycle of the present invention.

In addition to the chain stays 30, the bicycle frame includes a pair of seat stays 37, the top ends of which are pivotally connected to the top tube or seat tube 12, with the bottom ends being attached to respective ones of the drop-outs 33. In this respect, the seat stays 37, chain stays 30 and seat tube 12 define a rear triangle of the bicycle frame. The chain stays 30, seat stays 37 and drop-outs 33 also comprise part of the rear assembly 39 of the bicycle frame. Due to the front ends of the chain stays 30 being pivotally connected to the housing 16 and the top ends of the seat stays 37 being pivotally connected to the top tube or seat tube 12, the rear assembly 39 comprises part of an active rear suspension of the direct drive bicycle of the present invention, with the rear assembly 39 pivoting upwardly when the rear wheel 35 rotatably connected to the drop-outs 33 encounters a bump or other obstruction. However, those of ordinary skill in the art will recognize that the direct drive bicycle of the present invention may be provided with a "hard tail" bicycle frame wherein the front ends of the chain stays 30 are rigidly attached to the housing 16, with the top ends of the seat stays 37 being rigidly attached to the top tube or seat tube 12.

As seen in FIGS. 1 and 2, the housing 16 further includes a transmission bore 34 which is disposed therein and extends laterally therethrough adjacent the corner region defined between the top and front surfaces 18, 20. Rotatably mounted within the transmission bore 34 is a variable rate transmission unit 36. The transmission unit 36 comprises a main transmission housing 38 having an input shaft 40 integrally connected to and extending outwardly from one end thereof. Extending outwardly from the opposite end of the transmission housing 38 is an output shaft 42 which is coaxially aligned with the input shaft 40. The rotatable mounting of the transmission unit 36 within the transmission bore 34 is facilitated by a spaced pair of bearing members 44, each of which extends between the inner surface of the transmission bore 34 and the outer surface of the transmission housing 38. The bearing members 44 are maintained within the transmission bore 34 via respective ones of a pair of retaining rings 46.

As will be recognized, due to the integral connection of the input shaft 40 to the transmission housing 38, the rotation of the input shaft 40 facilitates the concurrent rotation of the transmission housing 38 relative to the housing 16 via the bearing members 44. The transmission unit 36 is configured such that the rotation of the transmission housing 38 relative to the housing 16 by the rotation of the input shaft 40 facilitates the rotation of the output shaft 42 at a rate different from that of the input shaft 40. In this respect, the rotation of the input shaft 40, and hence the transmission housing 38, at a first rate of RPM's will result in the simultaneous rotation of the output shaft 42 at a differing, second rate of RPM's. The differing rotational speeds of the input and output shafts 40, 42 relative to each other is selectively adjusted by shifting the internal gearing of the transmission unit 36 which is disposed within the transmission housing 38. Such shifting is accomplished through the use of shift levers which are attached to the down tube 14 or top tube of the bicycle frame and are mechanically coupled to the transmission unit 36 via one or more control cables. An exemplary transmission unit 36 which may be incorporated into the direct drive bicycle of the present invention is provided under the trademark NEXUS by the Japanese company Shimano.

As further seen in FIG. 2, attached to the input shaft 40 of the transmission unit 36 is an input sprocket 48, while attached to the output shaft 42 is an output sprocket 50. As seen in FIG. 1, the chain wheel 28 is mechanically coupled to the input shaft 40 via an input chain 52 which extends between the chain wheel 28 and the input sprocket 48. As will be recognized, due to the extension of the input chain 52 between the chain wheel 28 and the input sprocket 48, the rotation of the chain wheel 28 via the pedal cranks 24 and pedals 26 facilitates the concurrent rotation of the input shaft 40, and hence the transmission housing 38 relative to the housing 16. In the preferred embodiment, rotatably connected to the housing 16 between the chain wheel 28 and input sprocket 48 is an idler pulley 54 which is cooperatively engaged to the input chain 52 and is used to maintain a desired level of tension thereon.

As further seen in FIG. 1, attached to the rear wheel 35 of the direct drive bicycle, and more particularly to the axle 32 thereof, is a rear wheel sprocket 56. Extending between the output sprocket 50 attached to the output shaft 42 and the rear wheel sprocket 56 is an output chain 58 which is used to mechanically couple the output shaft 42 to the rear wheel. As will be recognized, due to the extension of the output chain 58 between the output sprocket 50 and the rear wheel sprocket 56, the rotation of the output shaft 42 facilitates the concurrent rotation of the rear wheel of the bicycle.

In the preferred embodiment, the front ends of the chain stays 30 are pivotally connected to the housing 16 in relative close proximity to the transmission unit 36 rotatably mounted within the transmission bore 34. In this respect, the swingarm pivot bore is separated from the transmission bore 34 by only a relatively small distance. These relative locations of the front ends of the chain stays 30 and the transmission unit 36 aids in reducing or eliminating any "chain growth" of the output chain 58 when the rear assembly 39 of the bicycle (including the chain stays 30 and seat stays 37) is pivoted upwardly as when the rear wheel 35 encounters a bump or other shock. Additionally, in the direct drive bicycle of the present invention, the transmission unit 36 is incorporated into the housing 16 rather than directly within the rear wheel 35 for purposes of reducing the unsprung weight on the rear suspension of the bicycle, and in particular the rear assembly 39 thereof. The wide range of swingarm positions of the chain stays 30 and seat stays 37 of the pivoting rear assembly 39 provides the rear suspension of the bicycle with anti-squat performance characteristics.

In the direct drive bicycle of the present invention, the inclusion of the transmission unit 36 within the housing 16 provides the bicycle with multiple speed capability, while eliminating multiple chain wheels, a sprocket cluster on the rear wheel axle 32, and front and rear derailleurs. In this respect, the inclusion of only the rear wheel sprocket 56 on the axle 32 rather than a sprocket cluster allows the rear wheel to have a wider "stance" without causing the same to be excessively oversized. This wider stance enhances the handling and performance of the bicycle. Due to the absence of the front and rear derailleurs, the direct drive bicycle of the present invention is also significantly less susceptible to mechanical breakdown.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A direct drive bicycle comprising:
   a bicycle frame having a seat tube which defines opposed ends and a pivoting rear assembly which extends rearwardly from the seat tube;
   a rear wheel rotatably connected to the rear assembly;
   a housing attached to one of the ends of the seat tube and disposed forwardly of the rear wheel;
   a variable rate transmission unit rotatably mounted within the housing, the transmission unit having input and output shafts which are simultaneously rotatable at differing rotational speeds;
   a crank axle rotatably mounted within the housing; and
   a chain wheel attached to the crank axle;
   said chain wheel being mechanically coupled to the input shaft and the output shaft being mechanically coupled to the rear wheel such that the rotation of the chain wheel facilitates the rotation of the rear wheel.

2. The bicycle of claim 1 further comprising:
   an input sprocket attached to said input shaft; and
   an input chain extending between the chain wheel and the input sprocket for mechanically coupling the chain wheel to the input shaft in a manner wherein the rotation of the chain wheel facilitates the rotation of the input shaft.

3. The bicycle of claim 2 further comprising an idler pulley rotatably connected to the housing and cooperatively engaged to the input chain to maintain a desired level of tension thereon.

4. The bicycle of claim 1 further comprising:
   a pair of pedal cranks attached to said crank axle; and
   a pair of pedals rotatably connected to respective ones of said pedal cranks.

5. The bicycle of claim 2 further comprising:
   an output sprocket attached to the output shaft;
   a rear wheel sprocket attached to the rear wheel; and
   an output chain extending between the output sprocket and the rear wheel sprocket for mechanically coupling the output shaft to the rear wheel in a manner wherein the rotation of the output shaft facilitates the rotation of the rear wheel.

6. The bicycle of claim 1 wherein the rear assembly of the bicycle frame comprises:
   a pair of chain stays having front ends which are pivotally connected to said housing.

7. The bicycle of claim 6 wherein the front ends of the chain stays are pivotally connected to the housing at a pivot point which is disposed adjacent the transmission unit mounted within the housing.

8. The bicycle of claim 1 wherein the transmission unit is rotatably mounted within the housing via at least one bearing member.

9. The bicycle of claim 8 wherein the transmission unit is rotatably mounted within the housing via a spaced pair of bearing members.

10. A direct drive bicycle comprising:
    a bicycle frame having a seat tube which defines opposed ends and a rear assembly which extends rearwardly from the seat tube;
    a rear wheel rotatably connected to the rear assembly;
    a housing attached to one of the ends of the seat tube and disposed forwardly of the rear wheel;
    a variable rate transmission unit rotatably mounted within the housing, the transmission unit having input and output shafts which are simultaneously rotatable at differing rotational speeds;
    a crank axle rotatably mounted within the housing; and
    a chain wheel attached to the crank axle;
    the chain wheel being mechanically coupled to the input shaft and the output shaft being mechanically coupled to the rear wheel such that the rotation of the chain wheel facilitates the rotation of the rear wheel.

11. A direct drive bicycle comprising:

a bicycle frame including a seat tube which defines opposed ends and a rear assembly which extends rearwardly from the seat tube;

a rear wheel rotatably connected to the rear assembly;

a housing directly attached to one of the ends of the seat tube and disposed forwardly of the rear wheel, the housing including a transmission bore which extends laterally therethrough; and a variable rate transmission unit rotatably mounted within the transmission bore of the housing via at least one bearing member.

12. The bicycle of claim 11 wherein the rear assembly of the bicycle frame is pivotally movable relative to the seat tube thereof.

13. The bicycle of claim 11 wherein the transmission unit is rotatably mounted within the transmission bore of the housing via a spaced pair of bearing members.

* * * * *